United States Patent [19]

Hartshorn et al.

[11] 4,325,835

[45] Apr. 20, 1982

[54] CATALYST COMPONENT

[75] Inventors: Angus J. Hartshorn, Runcorn; Eric Jones, Kelsall, both of England

[73] Assignee: Imperial Chemical Industries Limited, London, England

[21] Appl. No.: 164,932

[22] Filed: Jul. 1, 1980

[30] Foreign Application Priority Data

Jan. 10, 1980 [GB] United Kingdom ............... 00890/80
Jun. 6, 1980 [GB] United Kingdom ............... 18581/80

[51] Int. Cl.$^3$ .............................................. C08F 4/64
[52] U.S. Cl. .......................... 252/429 B; 252/429 C; 526/114; 526/116; 526/119
[58] Field of Search ....................... 252/429 C, 429 B

[56] References Cited

U.S. PATENT DOCUMENTS

| | | | |
|---|---|---|---|
| 3,114,742 | 12/1963 | Solvik et al. | 260/93.7 |
| 3,222,296 | 12/1965 | Aftandilian | 252/429 B |
| 3,400,110 | 9/1968 | Dassesse et al. | 252/429 C X |
| 3,663,451 | 5/1972 | Hill | 252/429 B X |
| 3,746,694 | 7/1973 | Cluff | 252/429 C X |
| 3,888,835 | 6/1975 | Ito et al. | 252/429 C X |
| 4,020,007 | 4/1977 | Naylor | 252/429 B |
| 4,027,089 | 5/1977 | Aishima et al. | 252/429 C X |
| 4,130,699 | 12/1978 | Hoff et al. | 252/429 B X |
| 4,136,058 | 1/1979 | Harris et al. | 252/429 C X |
| 4,154,701 | 5/1979 | Melquist | 252/429 C X |

FOREIGN PATENT DOCUMENTS

| | | |
|---|---|---|
| 1251177 | 10/1971 | United Kingdom . |
| 1336881 | 11/1973 | United Kingdom . |
| 1348255 | 3/1974 | United Kingdom . |
| 1373981 | 11/1974 | United Kingdom . |
| 1373982 | 11/1974 | United Kingdom . |
| 1436426 | 5/1976 | United Kingdom . |
| 1547886 | 6/1979 | United Kingdom . |

*Primary Examiner*—Patrick Garvin
*Attorney, Agent, or Firm*—Cushman, Darby & Cushman

[57] ABSTRACT

A component for an olefin polymerization catalyst which is the product of treating a particulate support material with (a) an organo-magnesium compound, (b) an aluminium compound e.g. ethyl aluminium dichloride, (c) an organometallic compound of general formula $R_mMX_p$ wherein M is a metal of Groups IA, IIA, IIB, IIIB, VA or VIA of the Periodic Table, R is a hydrocarbyl or substituted hydrocarbyl group, X is a singly charged anionic ligand or a monodentate neutral ligand, m is an integer up to the highest valency of the metal M and p is 0 or an integer up to 2 less than the valency of the metal M, e.g. zirconium tetrabenzyl, and (d) at least one transition metal compound of Groups IVA, VA or VIA, e.g. titanium tetrachloride. The catalyst component can be used to effect copolymerization of ethylene with an alpha-olefin monomer such as butene-1 in a fluidized bed reactor.

25 Claims, No Drawings

CATALYST COMPONENT

The present invention relates to a component of an olefin polymerisation catalyst, a process for the production thereof, polymerisation catalysts including the said component of an olefin polymerisation process using such catalysts.

It is well known that olefins such as ethylene, propylene and higher alpha-olefins, e.g. hexene, can be polymerised using the so-called Ziegler-Natta catalysts. The term "Ziegler-Natta catalyst" is generally used to mean a catalyst system obtained from a compound of a transition metal of Groups IVA to VIA of the Periodic Table (typically titanium tetrachloride) together with a Ziegler catalyst activator such as an activating organometallic compound of a non-transition metal of Groups IA to IIIA of the Periodic Table (typically triethyl aluminium). Such Ziegler-Natta catalysts may be supported on particulate support materials; suitable support materials include inorganic oxides such as silica and/or alumina.

One such catalyst is disclosed in U.K. Pat. No. 1,373,982 which catalyst is obtained by (a) reducing a transition-metal compound, the metal of which is in a state of maximum valency, with a reducing mixture of an aluminium compound and an organomagnesium compound to form a catalyst component and (b) subsequently adding a so-called activating organoaluminium compound to the said component to activate the said component and form the catalyst.

For certain applications, for example when a polyalkylene, for example, polyethylene or a copolymer thereof, is used for blow moulding purposes, it is desirable to have a polymer having a broader molecular weight distribution than that of the polymers obtained when using catalysts such as described in U.K. Pat. No. 1,373,982. We have now found that the incorporation into catalysts of the type disclosed in U.K. Pat. No. 1,373,982 of certain organometallic compounds (in addition to the organo-magnesium compound and the aluminium compound envisaged in U.K. Pat. No. 1,373,982) leads to a desirable broadening of the molecular weight distribution of the resulting polymer.

Accordingly one aspect of the present invention provides a catalyst component which is the product of treating a particulate support material, preferably having a reactive surface (as hereinafter defined), with (a) at least one organomagnesium compound, (b) at least one aluminium compound of the general formula:

$R_nAlY_{3-n}$ wherein R, each of which may be the same or different, represents a hydrocarbyl group or substituted hydrocarbyl group such as alkyl, aryl, cycloalkyl, aralkyl, alkenyl or alkadienyl, n is 0, 1, 2, 3 or a fraction less than 3, and Y is a singly charged ligand such as hydride, fluoride, chloride, bromide, iodide or oxyhydrocarbyl, (c) at least one organometallic compound of the general formula:

$R_m^1MX_p$ wherein M is a metal of Groups IA, IIA, IIB, IIIB, IVA, VA or VIA of the Periodic Table, $R^1$ is a hydrocarbyl or a substituted hydrocarbyl group, X is a singly charged anionic ligand or a monodentate neutral ligand, m is an integer up to the highest valency of the metal M and p is 0 or an integer up to 2 less than the valency of the metal M, except that when M is a metal from Group VIA p is always 0, and when M is a metal from Groups IVA, VA or VIA m has a value from 2 to the highest valency of the metal and p has a value from 0 to a value of 2 less than the valency of the metal M, and (d) at least one transition metal compound of Groups IVA, VA or VIA, of the Periodic Table, (e) optionally at least one pacifying agent, with the provisos that (i) at least the at least one organomagnesium compound or the at least one aluminium compound $R_nAlY_{3-n}$ or the at least one organometallic compound $R_m^1MX_p$ or the at least one transition metal compound of Groups IVA, VA or VIA contains a halide group, (ii) where the organomagnesium compound or the at least one aluminium compound $R_nAlY_{3-n}$ or the at least one organometallic compound $R_m^1MX_p$ is a Ziegler-Natta activator and the support is treated therewith after treatment with the at least one transition metal compound of Groups IVA, VA or VIA the support is treated with a pacifying agent after treatment with the said activator and (iii) where the metal M in organometallic compound $R_m^1MX_p$ is magnesium, the organometallic compound $R_m^1MX_p$ and the organomagnesium compound must not be added consecutively or together as a mixture, and that when the metal M in organometallic compound $R_m^1MX_p$ is aluminium, the organometallic compound $R_m^1MX_p$ and the aluminium compound $R_nAlY_{3-n}$ must not be added consecutively or together as a mixture or complex.

All references to the Periodic Table are to the version of the Periodic Table of the Elements printed inside the back cover of "Advanced Inorganic Chemistry" by F A Cotton and G Wilkinson 3rd Edition, Interscience Publishers 1976.

Where the preparation of the catalyst component of the present invention includes treatment with a so-called "pacifying agent" we have found that the activity of catalysts prepared from such pacified catalyst components is greater than that of catalysts prepared from comparable unpacified catalyst components.

By "reactive surface" we mean a plurality of sites on, and preferably attached to, the surface of the substantially inert particulate support material, which sites are capable of abstracting, e.g. a magnesium hydrocarbyl from a solution thereof. Preferably the said sites are OH groups chemically bonded to the surface of the particulate support material and the particulate support material is an inorganic material. Where surface OH groups are present they are capable of acting as a proton source, that is they have an acidic function. Such a material will be "substantially inert" in that, whereas the said OH groups are capable of reacting with, say, the organomagnesium compound and the organometallic compound $R_m^1MX_p$ the bulk of the support material is chemically inert. Particularly good examples of such support materials are silica and alumina or mixtures thereof. These comprise a matrix of silicon or aluminium and oxygen atoms, to the surface of which OH groups are attached, the hydrogen atoms of said groups having an acidic function. However, apart from the presence of these OH groups, silica and alumina are generally regarded as chemically inert. Within the terms silica and alumina we include silica and alumina based materials containing small amounts of other suitable inorganic oxides, such as magnesium oxide and zinc oxide. The preferred matrices are silica and/or alumina.

The at least one organomagnesium compound used for the preparation of the catalyst components according to the invention are compounds in which at least one hydrocarbyl group is directly bonded to magnesium through a carbon atom. Preferably two hydrocarbyl groups bonded in this way are present for each magnesium atom, which hydrocarbyl groups may be the same or different, although we do not exclude the possiblity that one of the groups bonded to the magnesium may be halogen or oxyhydrocarbyl. The hydrocarbyl group may be an alkyl group, aryl group, cycloalkyl group, aralkyl group, alkadienyl group or an alkenyl group. The number of carbon atoms in the hydrocarbon group is generally between 1 and 30, but this number is not critical. Preferably the organomagnesium compounds are soluble in liquid hydrocarbons, for example toluene, hexane. Examples of magnesium compounds particularly suitable for use in the process according to the invention are diethyl magnesium, dipropyl magnesium, di-isopropyl magnesium, dibutyl or disobutyl magnesium, butyl octyl magnesium, diamyl magnesium, dihexyl magnesium, diallyl magnesium, didecyl magnesium, and didodecyl magnesium, dicycloalkyl magnesium with identical or different cycloalkyl groups containing 3 to 12 carbon atoms, preferably 5 or 6 carbon atoms. The magnesium may further carry an alkyl and a cyclo-alkyl group. Diphenyl-magnesium is the preferred aromatic compound although e.g. ditolyl-dixylyl magnesium, and magnesium aryls derived from compounds with two or more condensed or non-condensed aromatic nuclei can also be used. Catalysts prepared with diaryl magnesium compounds may have a relatively lower activity.

Preferably a dialkyl magnesium is used wherein the alkyl groups are $C_1$-$C_{10}$ groups, particularly preferably dibutyl magnesium which may be present as a mixture of dibutyl magnesiums, for example a mixture of di-n-butyl magnesium and di-iso-butyl magnesium.

In the at least one aluminium compound $R_nAlY_{3-n}$ preferably R, where present, is alkyl, having 1 to 4 carbon atoms more preferably ethyl or isobutyl, and preferably Y, where present, is a halide, particularly preferably chloride or bromide, more particularly preferably chloride.

Suitable aluminium compounds $R_nAlY_{3-n}$ include aluminium chloride, aluminium bromide, monoethyl aluminium dichloride, ethyl aluminium sesqui-chloride and diethyl aluminium chloride.

When M in organometallic compound $R_m^1MX_p$ is a metal from Groups IA, IIA, IIB or IIIB of the Periodic Table it is preferred that p is 0 and m is the highest valency of the metal.

Preferred organometallic compounds $R_m^1MX_p$ are those in which the metal M is a transition metal of Groups IVA, VA or VIA, more preferably titanium, vanadium, molybdenum, zirconium or chromium, and especially zirconium. The monovalent ligand X, where it is present, is preferably halogen.

Hydrocarbyl groups of different types may be associated with a single metal atom M.

Suitable hydrocarbyl groups $R^1$ include alkyl and alkenyl groups (including $\pi$-alkenyl groups such as $\pi$-allyl) and substituted derivatives thereof. Examples of transition metal complexes include tetrakis($\pi$-allyl)zirconium or hafnium, tris($\pi$-allyl)chromium, tetrakis($\pi$-methyallyl)zirconium or hafnium, tris($\pi$-methallyl)chromium and zirconium tris($\pi$-allyl)bromide.

A preferred class of organometallic compounds $R_m^1MX_p$ are organic transition metal complexes in which some or all of the groups, or ligands $R^1$ are substituted alkyl groups of general formula —$CH_2Z$ $\sigma$-bonded to the transition metal through the carbon atom. In this general formula Z may represent a group capable of interaction with the vacant d-orbitals of the metal M. Preferably all of the groups $R^1$ have this formula, but it is possible for some of them to comprise other hydrocarbon groups.

Suitable substituent groups Z include aromatic and polyaromatic groups such as phenyl and naphthyl, giving rise in the formula —$CH_2Z$ to the alkaryl groups benzyl and (1-methylene-1-naphthyl) and ring substituted derivatives thereof, for example p-methyl benzyl.

Z may also be a cycloalkenyl group, such as a cyclooctenyl group.

Z may also comprise a group of general formula: $A(R^2)_3$ where A represents carbon, silicon, germanium, tin or lead, and each $R^2$, which may be the same or different, represents a hydrocarbyl group or hydrogen; preferably at least one $R^2$ is an alkyl group.

Examples of this preferred class of organometallic compounds $R^1MX_p$ include zirconium and titanium tetra(benzyl), tris(benzyl)zirconium chloride, zirconium tetrakis(p-methylbenzyl), zirconium and titanium tetrakis(1-methylene-1-naphthyl), zirconium tetrakis(trimethylsilylmethylene), zirconium tetrakis(neopentyl) and zirconium tetrakis(neophyl).

Examples of preferred organometallic compounds $R^1MX_p$ containing monovalent ligands X include tris($\pi$-allyl)zirconium chloride, bromide or iodide and the equivalent $\pi$-methallyl and benzyl compounds.

The at least one transition metal compound of Groups IVA, VA or VIA of the Periodic Table employed in the preparation of the catalyst component of the present invention may be any of the transition metal compounds, or mixtures thereof, known to be useful in forming Ziegler-Natta catalysts.

The transition metal is preferably titanium, vanadium, molybdenum, zirconium or chromium, especially titanium. Suitable compounds include halides, halo-oxides alkoxides, haloalkoxides, and acetyl acetonates, especially chlorides and alkoxides. The preferred compound is titanium tetrachloride.

Suitable pacifying agents, where they are employed in the preparation of catalyst components of the present invention, include agents which, it is believed, are capable of breaking metal-carbon or metal-hydrogen bonds in the catalyst component but which do not have a deleterious effect on the catalyst component. Such agents include inter alia oxygen, carbon monoxide, carbon dioxide, esters and protic agents. Typically, protic agents are hydrogen halides, carboxylic acids, alcohols, water, amines and acetylacetone. Preferably the pacifying agent is an aliphatic alcohol having from 1 to about 6 carbon atoms or an ahydrous hydrogen halide such as hydrogen fluoride, hydrogen chloride, hydrogen bromide or hydrogen iodide or a mixture thereof. Hydrogen halides and particularly hydrogen chloride, are preferred.

The quantity of the at least one pacifying agent used is sufficient to break substantially all the metal-hydrocarbyl or metal-hydride bonds in the catalyst component. Conveniently excess hydrogen chloride gas is bubbled through a suspension of the treated support and excess removed by sparging with nitrogen.

The molar ratio of the aluminium compound $R_nAlY_{3-n}$ to the organo-magnesium compound in the catalyst component of the present invention is preferably between 0.5 and 100, particularly between 1.0 and 80 and more particularly preferably between 1.0 and 10.0. The molar ratio of aluminium compound to organometallic compound $R_m{}^1MX_p$ is preferably between 1.0 and 100 and particularly between 1 and 20. The molar ratio of the aluminium compound to transition metal compound is preferably between 1 and 2000, particularly between 2 and 1500 and more particularly preferably between 2 and 100.

The particulate support material may be treated with the at least one organomagnesium compound, the at least one aluminium compound $R_nAlY_{3-n}$, the at least one organometallic compound $R_m{}^1MX_p$ and the at least one transition metal compound of Groups IVA, VA or VIA in any order, within the limits of the provisos as hereinbefore defined, either separately or in combination with one another (as two of the three compounds or as all three compounds).

A further aspect of the present invention provides an olefin polymerisation catalyst which comprises (a) the catalyst component as hereinbefore defined and (b) an activator which is an organometallic compound of a metal of Groups I–IV of the Periodic Table.

Preferably the activator is an organometallic derivative of a metal of Groups IA, IIA, IIB, IIIB or IVB of the Periodic Table, particularly preferably the metal is aluminium and more particularly preferably the activator is a trialkyl aluminium, dihaloalkyl aluminium or halodialkyl aluminium. It will be appreciated that sufficient of the said activator is employed to transform the metal atoms of the transition metal compound known to be useful in forming Zeigler-Natta catalysts to an active state.

The catalyst component of the present invention may be treated with the aforesaid activator by methods known in the art, for example, they may be reacted totally outside or inside the polymerisation vessel in which the catalyst is to be used or activation may be effected partially outside the polymerisation vessel and completed inside the said polymerisation vessel.

A further aspect of the present invention provides a process for the polymerisation or copolymerisation of an olefinically unsaturated monomer which process comprises contacting, under polymerisation conditions, at least one olefin monomer with a catalyst in accordance with the present invention.

The term "olefinically unsaturated monomer" is intended to include mono-olefins such as ethylene, propylene and 4-methylpentene-1.

Our catalyst may also be used to initiate the copolymerisation of two or more olefinically unsaturated monomers. For example, ethylene may be copolymerised with a small amount of propylene, butene, hexene or decene, butadiene or styrene.

Polymerisation processes according to the present invention may be carried out by techniques generally used for polymerisation processes of the type using Zeigler catalysts.

The choice of conditions of pressure and temperature will vary with factors such as the nature of the monomer and catalyst and whether liquid, e.g. bulk or diluent, or gas phase polymerisation is used.

For example, when ethylene is polymerised, pressures from sub-atmospheric to several thousand atmospheres may be used. Low pressure (say from 0.1 to 30 atmospheres) and intermediate pressure (say from 30 to 300 atmospheres) polymerisation may be carried out using conventional equipment; but very high pressure polymerisation must be performed using suitable specialised reactors and pumping equipment. However, since, generally speaking, the higher the pressure the higher the activity, the use of such techniques may be justified. If very high pressures are used, it is preferred that conditions are such that the ethylene feed and polyethylene produced are maintained in a single fluid phase, i.e. the pressure should exceed 500 $Kg/cm^2$ preferably 1000 to 3000 $Kg/cm^2$ and the temperature should be greater than 125° C., say 140°–300° C. This type of process is usually operated in a continuous manner.

A wide range of temperatures may be used, but in general low and intermediate pressure ethylene polymerisations are carried out at temperatures in the range 50°–160° C.

When the process of our invention is used to polymerise propylene, it is preferred to operate under conditions commonly used for the polymerisation of propylene. However, polymerisation of propylene under other conditions, e.g. high pressure, is not excluded.

It is also within the scope of our invention to use our compositions to initiate the copolymerisation of ethylene and propylene together and/or with other olefinically unsaturated monomers.

The polymerisation process of the present invention may be carried out in the liquid or gaseous phase (i.e. in the essential absence of a liquid medium) and preferably in the gaseous phase. Where polymerisation is effected in the liquid phase, and the monomer is not liquid under the polymerisation conditions, the monomer may be dissolved in a suitable solvent. Examples of suitable solvents are aliphatic or aromatic hydrocarbons; for instance pentane, hexane, heptane, octane, decane, benzene, toluene and mixtures thereof.

Polymerisation may be effected either in a batch manner or on a continuous basis, and the catalyst components of the present invention and the activator therefor may be introduced into the polymerisation vessel separately or the catalyst component and activator may be mixed together before being introduced into the polymerisation reactor.

Preferably, however, the polymerisation process of the present invention is effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidised by the continuous flow of the gaseous monomer, and gaseous diluent to remove heat of polymerisation through the reaction zone. A suitable rate of gas flow may be readily determined by simple experiment. Make up of gaseous monomer to the circulating gas stream is at a rate equal to the rate at which particulate polymer product is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The said gas is compressed in a compressor and passed through a heat exchanger wherein it is stripped of the heat of polymerisation and then returned to the reaction zone.

Chain transfer agents may be used in a polymerisation process according to our invention, and when ethylene is polymerised their use is normally desirable as the polyethylene produced is of very high molecular weight. Hydrogen may be conveniently used in accordance with usual practice. However, some solvents may act as chain transfer agents.

Our process is preferably effected under an atmosphere free of oxygen, for example under an atmosphere of an inert gas, e.g. nitrogen, or of the monomer to be polymerised. It is also preferred to effect the process using apparatus and solvents which have been carefully freed from impurities, such as oxygen, water and other substances which would otherwise react with the catalysts.

The invention is illustrated by the following Examples.

In the examples hexane and heptane were purified by passage through $R_{3-11}$ copper catalyst and 5 A molecular sieve and finally by sparging with pure nitrogen immediately before use.

Ethylene and butene were purified by passage through $R_{3-11}$ copper catalyst and 5 A molecular sieve. Hydrogen was purified by passage through a catalytic deoxygenation unit and 5 A molecular sieve. Melt Flow Index $MFI_{2.16}$ was measured under the conditions of ASTM D-1238, condition E at 190° C. and reported as grams per 10 minutes.

Melt Flow Index $MFI_{21.6}$ was measured under the conditions of ASTM D-1238, condition F using 10 times the weight used in the aforesaid melt index test.

Flow Ratio = $MFI_{21.6}/MFI_{2.16}$

EXAMPLE 1

This example is a comparative example illustrating the preparation of a known catalyst and the use thereof in the preparation of an ethylene copolymer.

A particulate support material comprising alumina (Ketjen Grade B (Registered Trade Mark) supplied by Koninklijke Zwavelzurfarbrieken v/n Ketjen NV) having a particle size in the range 20 to 120 microns was heated at 700° C. for 4 hours under a flow of dry nitrogen to free it from adsorbed water.

To 130 ml of n-hexane at −20° C. was added with stirring 72 mls of 0.62 molar ethyl aluminium dichloride in n-hexane, 36 mls of 0.62 molar dibutyl magnesium in Isopar E and 12 mls of 0.62 molar titanium tetrachloride in hexane. The mixture was stirred at −20° C. for 3 hours. 13.8 grams of the dried alumina was slurried in 100 mls of hexane in an atmosphere of dry nitrogen and 46 mls of the catalyst mixture added with stirring at ambient temperature. The solvent was removed under a stream of nitrogen at 80° C. and the resulting powder dried under vacuum to afford the catalyst component which was then reslurried in heptane to give a concentration of 0.0138 m A.Ti.ml$^{-1}$ (milliatom titanium per milliliter of slurry).

A one U.S. gallon stainless steel pressure vessel was prepared by heating it to 100° C. and evacuating with an efficient vacuum pump. The vessel was cooled to 60° C. and 2 liters of purified hexane added. The vessel was then sparged at reaction pressure with about 200 l of pure ethylene over a period of 30 minutes to remove any residual moisture and oxygen, after which it was vented, 6 mls of a molar solution of aluminium tri-isobutyl in heptane as activator and then the catalyst component as a slurry (containing 0.01 mA of titanium) were injected against a stream of ethylene. The vessel was then sealed and pressurised with hydrogen to 1.7 kg/cm$^2$ g and then to 13.6 kg/cm$^2$ g with ethylene. During pressurisation, 200 mls of butene-1 was added from a Klinger gauge. When full reaction pressure (13.6 kg/cm$^2$ g) was reached the vessel was stirred at 1000 rpm and polymerisation commenced. Reaction was allowed to continue for 2 hours at 80° C., during which time ethylene was added as required to maintain reaction pressure at 13.6 kg/c$^2$ g. After 2 hours, the reactor was vented and cooled.

The copolymer slurry was removed from the autoclave and to this was added 1 liter of de-ionised water and 0.02 wt/vol % of sodium di(ethylhexyl)sulphosuccinate (Aerosol OT) calculated on polymer slurry, i.e. diluent, as a wetting agent. Steam at 100° C. was then passed into the stirred vessel at about 25 g per minute and the mixture distilled at a temperature of about 60° C., distillation being continued until no more organic material separated from the distillate. The copolymer product, which was granular in form, was then filtered from the aqueous slurry remaining in the distillation vessel, washed with water and dried under vacuum at approximately 60° C. 261 gms of copolymer product were obtained and were found to contain 1.0 molar percent of butene-1. The melt flow index (M.F.I.) of the copolymer was 0.22 and the flow ratio was 25 being indicative of a very narrow molecular weight distribution.

The mole % comonomer incorporation was obtained from the IR analysis of the total methyl group count of the copolymer. The total methyl count, i.e. both methyl groups which are at ends of molecules and those which are at ends of side branches, was measured using a mathematical comparison, by computer, of the absorbance curve from 1310–1430 cm$^{-1}$ with two standard polyethylenes of known methyl count. A correction was then made for those methyl groups which are ends of molecules by subtracting the methyl count of a linear polyethylene of similar molecular weight distribution having a similar MFI. The corrected methyl count was then taken to be the side group content and expressed as mole % co-monomer incorporation.

EXAMPLE 2

This example illustrates the preparation of a novel catalyst according to the present invention and the use thereof in the preparation of polyethylene copolymer.

Alumina as used in Example 1 was dried by heating at 500° C. for 2 hours under a flow of dry nitrogen.

6.5 grams of the dried alumina was slurried in 50 mls of hexane in an atmosphere of dry nitrogen. 22 mls of a 0.196 M solution of pure tetrabenzyl zirconium in toluene was added and stirred for 15 minutes, after which 8.1 mls of 0.62 M ethyl aluminium dichloride in hexane was added and stirred for a further 15 minutes. Any unreacted ethyl aluminium dichloride was then removed with the supernatant liquid and the residual solid washed three times with 100 ml portions of hexane. The slurry, again in 50 mls of hexane, was then treated with 3 mls of 0.62 M dibutyl magnesium in Isopar E, stirred for 15 minutes and then finally 3.0 mls of 1.0 M titanium tetrachloride in hexane was added, stirred at ambient temperature for 15 minutes, then heated to reflux for 30 minutes. The slurry was then cooled, dry HCl gas passed in for 2 minutes, followed by nitrogen sparging for 15 minutes to remove excess HCl, then dried under vacuum to give a pale brown powder (a catalyst component according to the present invention) which was slurried in heptane to give a concentration of 0.037 m Atom total transition metal ml$^{-1}$.

The polymerisation procedure of Example 1 was repeated except that 6.0 mls of a molar solution of aluminium tri-n-octyl in heptane (as activator) and 1.3 ml of the catalyst component of the present invention prepared in Example 2 (containing 0.048 m Atoms of total transition metal) was used the reactor being pressurised first to 30 psig with hydrogen, then to 150 psig with ethylene. 200 mls of liquid butene-1 was added during pressurisation to 150 psig. The polymerisation was allowed to continue for 2 hours at 80° C.

The copolymer product was worked up as in Example 1 to yield 175 grams containing 2.7 molar percent butene-1. The MFI was 0.26 and the flow ratio was 55 being indicative of a much broader molecular weight distribution than that of the polymer obtained in Example 1.

EXAMPLE 3

This example illustrates the improvement in catalyst activity obtained with a pacified catalyst.

The catalyst preparation procedure of Example 2 was repeated except that the dried alumina was treated with (a) tetrabenzyl zirconium (40 mls of 0.19 M solution in toluene), (b) ethyl aluminium dichloride (123 mls of 0.62 M solution in hexane) and washed free of unreacted ethyl aluminium dichloride with hexane, (c) dibutyl magnesium (41 ml of 0.62 M solution in Isopar E) and washed free of unreacted dibutyl magnesium, and (d) titanium tetrachloride (7.6 mls of 1.0 M solution in hexane). The alumina was then freed from solvent under vacuum.

A first sample of the solvent freed alumina (4.9 gms) was slurried in 120 mls of heptane to give Slurry A. A second sample of the solvent freed alumina (4.25 gms) was slurried in heptane, anhydrous hydrogen chloride gas was passed through the slurry for 1 minute followed by sparging with nitrogen for 15 minutes to give Slurry B. Slurries A and B were then tested as catalyst components in the polymerisation of ethylene.

The polymerisation of ethylene was carried out as follows. A commercial hydrogenator (Hydrogenation Control Unit from Electrosound Supplies Ltd) was adapted to deliver ethylene to a 500 ml vessel containing 200 ml iso-octane at 20° C. The vessel was stirred with a VIBRO-MIXER E1. 2.0 ml of 0.8 M tri n-octyl aluminium was added to the iso-octane which was then saturated with ethylene at 80° C. and the polymerisation started by addition of 1.0 ml of Slurry A. After 1 hour the yield of polymer was 1.4 grams. The polymerisation process was repeated using Slurry B as the catalyst component, 2.4 gms of polymer were obtained. These results indicate that a catalyst prepared from a pacified catalyst component of the present invention (Slurry B) is more active than a catalyst prepared from an unpacified catalyst component (Slurry A).

What we claim is:

1. A catalyst component which is the product of reacting a particulate support material which has a reactive surface comprising a plurality of sites on the surface of the support which are capable of abstracting a magnesium hydrocarbyl from a solution thereof with
   (a) at least one organomagnesium compound in which magnesium is directly bonded through a carbon atom to a first hydrocarbyl group and is bonded to a halogen, or oxyhydrocarbyl or a second hydrocarbyl group, the hydrocarbyl group or groups being alkyl, aryl, cycloalkyl, aralkyl, alkadienyl or alkenyl,
   (b) at least one aluminum compound of the general formula: $R_nAlY_{3-n}$ wherein R, each of which may be the same or different, represents a hydrocarbyl group which is an alkyl, aryl, cycloalkyl, aralkyl, alkenyl or alkadienyl group, n is 0, 1, 2, 3 or a fraction less than 3, and Y is a singly charged ligand which is hydride, fluoride, chloride, bromide, iodide or oxyhydrocarbyl,
   (c) at least one organometallic compound of the general formula: $R_m^1MX_p$ wherein M is a metal of Groups IA, IIA, IIB, IIIB, IVA, VA or VIA of the Periodic Table, $R^1$ is a hydrocarbyl or a substituted hydrocarbyl group, X is a halogen, m is an integer up to the highest valency of the metal M and p is 0 or an integer up to 2 less than the valency of the metal M, except that when M is a metal from Group VIA, p is always 0, and when M is a metal from Groups IVA, VA or VIA m has a value from 2 to the highest valency of the metal and p has a value from 0 to a value of 2 less than the valency of the metal M, and
   (d) at least one transition metal compound of Groups IVA, VA or VIA of the Periodic Table which is known to be useful in forming Ziegler-Natta catalysts, in which catalyst component the molar ratio of the aluminum compound to the organomagnesium compound is between 0.5 and 100, the molar ratio of the aluminum compound to the organometallic compound is between 1.0 and 100 and the molar ratio of the aluminum compound to the transition metal compound is between 1.0 and 2000, which reaction may be effected in any order or combination with the provisos that (i) the at least one organomagnesium compound or the at least one aluminum compound $R_nAlY_{3-n}$ or the at least one organometallic compound $R_m^1MX_p$ or the at least one transition metal compound of Groups IVA, VA or VIA contains a halide group, (ii) where the organomagnesium compound or the at least one aluminum compound $R_nAlY_{3-n}$ or the at least one organometallic compound $R_m^1MX_p$ is a Ziegler-Natta activator and the support is treated therewith after treatment with the at least one transition metal compound of Groups IVA, VA or VIA the support is treated with a pacifying agent which is capable of breaking metal-carbon or metal-hydrogen bonds in the catalyst component but does not have a deleterious effect on the catalyst component and which is used in sufficient quantity to break substantially all the metal-hydrocarbyl or metal-hydride bonds in the catalyst component, after treatment with the said activator and (iii) where the metal M in organometallic compound $R_m^1MX_p$ is magnesium, the organometallic compound $R_m^1MX_p$ and the organo-magnesium compound must not be added consecutively or together as a mixture, and that when the metal M in organometallic compound $R_m^1MX_p$ is aluminum, the organometallic compound $R_m^1MX_p$ and the aluminum compound $R_nAlY_{3-n}$ must not be added consecutively or together as a mixture or complex.

2. A catalyst component as claimed in claim 1 wherein the reactive surface comprises OH groups attached to the surface of a substantially inert particulate support material.

3. A catalyst component as claimed in claim 2 in which the support material is silica and/or alumina.

4. A catalyst component as claimed in claim 1 in which the at least one organomagnesium compound has two hydrocarbyl groups directly bonded to magnesium.

5. A catalyst component as claimed in claim 4 wherein the two hydrocarbyl groups are alkyl groups having 1–10 carbon atoms.

6. A catalyst component as claimed in claim 5 wherein at least one of the alkyl groups is butyl.

7. A catalyst component as claimed in claim 1 wherein in the at least one aluminium compound of the general formula $R_nAlY_{3-n}$, R is an alkyl group having 1 to 4 carbon atoms.

8. A catalyst component as claimed in claim 1 wherein in the at least one aluminium compound of the general formula $R_nAlY_{3-n}$, Y is a halide.

9. A catalyst component as claimed in claim 1 wherein the at least one aluminium compound is selected from the group consisting of aluminium chloride, aluminium bromide, monoethyl aluminium dichloride, ethyl aluminium sesqui-chloride and diethyl aluminium chloride.

10. A catalyst component as claimed in claim 1 wherein in organometallic compound $R_m{}^1MX_p$, M is a metal from Groups IA, IIA, IIB or IIIB of the Periodic Table, p is 0 and m is the highest valency of the metal.

11. A catalyst component as claimed in claim 1 wherein in the organometallic compound $R_m{}^1MX_p$ M is a transition metal of groups IVA, VA or VIA of the Periodic Table.

12. A catalyst component as claimed in claim 11 wherein in the organometallic compound $R_m{}^1MX_p$ at least one of the hydrocarbyl groups $R^1$ is $\pi$-allyl or $\pi$-methallyl.

13. A catalyst component as claimed in claim 12 wherein the organometallic compound is selected from the group consisting of tetrakis($\pi$-allyl)zirconium and hafnium, tris($\pi$-allyl)chromium, tetrakis($\pi$-methallyl)zirconium and hafnium, tris($\pi$-methallyl)chromium and zirconium tris($\pi$-allyl)bromide.

14. A catalyst component as claimed in claim 11 wherein in the organometallic compound $R_m{}^1MX_p$, at least one of the hydrocarbyl or substituted hydrocarbyl groups $R^1$ has the formula —CH$_2$Z and is sigma-bonded to the transition metal M through the carbon atom where Z is a mono or polyaromatic group, cycloalkenyl group or the group —A($R^2$)$_3$ where A represents carbon, silicon, germanium, tin or lead and $R^2$ represents a hydrocarbyl or substituted hydrocarbyl group or hydrogen.

15. A catalyst component as claimed in claim 14 wherein —CH$_2$Z is selected from the group consisting of benzyl, 1-methylene-1-naphthyl, p-methylbenzyl, trimethylsilylmethane, neopentyl and neophyl.

16. A catalyst component as claimed in claim 15 wherein the at least one organometallic compound $R_m{}^1MX_p$ is selected from the group consisting of zirconium and titanium tetrabenzyl, tris(benzyl)zirconium chloride, zirconium tetrakis(p-methylbenzyl), titanium and zirconium(1-methylene-1-naphthyl), zirconium tetrakis(trimethylsilylmethylene), zirconium tetrakis(neopentyl) and zirconium tetrakis(neophyl).

17. A catalyst component as claimed in claim 1 wherein in the at least one transition metal compound of Groups IVA, VA or VIA of the Periodic Table the transition metal is selected from the group consisting of titanium, zirconium, vanadium, molybdenum and chromium.

18. A catalyst component as claimed in claim 17 wherein the at least one transition metal compound is selected from the group consisting of halide, halo-oxide, alkoxide, haloalkoxide, and acetylacetonate.

19. A catalyst component as claimed in claim 1 which has been treated with a pacifying agent which is capable of breaking metal-carbon or metal-hydrogen bonds in the catalyst component but does not have a deleterious effect on the catalyst component and which is used in sufficient quantity to break substantially all the metal-hydrocarbyl or metal-hydride bonds in the catalyst component.

20. A catalyst component as claimed in claim 19 in which the pacifying agent is oxygen, carbon monoxide, carbon dioxide, or a protic agent which is a hydrogen halide, carboxylic acid, alcohol, water, amine or acetylacetone.

21. A catalyst component as claimed in claim 20 in which the protic agent is an aliphatic alcohol having 1 to about 6 carbon atoms or an anhydrous hydrogen halide.

22. An olefin polymerisation catalyst comprising a catalyst component as claimed in claim 1 activated with a suitable activator which is an organometallic compound of a metal of Groups I to IV of the Periodic Table.

23. An olefin polymerisation catalyst as claimed in claim 22 wherein the said metal is from Groups IA, IIA, IIB, IIIB or IVB of the Periodic Table.

24. A catalyst as claimed in claim 23 wherein the said metal is aluminium.

25. A process for the preparation of a catalyst component as claimed in claim 1 comprising the steps of treating the particulate support material with at least one organomagnesium compound, at least one aluminium compound of the general formula $R_nAlY_{3-n}$, at least one organometallic compound of the general formula $R_m{}^1MX_p$ and at least one transition metal compound of Groups IVA, VA or VIA of the Periodic Table.

* * * * *